(12) United States Patent
Gurin

(10) Patent No.: US 7,195,723 B1
(45) Date of Patent: Mar. 27, 2007

(54) COLLOIDAL SOLUTIONS AND NANOCOMPOSITES OF ELECTRIDES AND ALKALIDES AND METHODS OF USE

(76) Inventor: Michael H. Gurin, 4132 Cove La., Suite A, Glenview, IL (US) 60025

( * ) Notice: Subject to any disclaimer, the term of this patent is extended or adjusted under 35 U.S.C. 154(b) by 550 days.

(21) Appl. No.: 10/686,337

(22) Filed: Oct. 16, 2003

Related U.S. Application Data

(63) Continuation-in-part of application No. 10/642,560, filed on Aug. 18, 2003.

(51) Int. Cl.
H01B 1/06 (2006.01)
H01L 31/00 (2006.01)
H05B 33/00 (2006.01)

(52) U.S. Cl. .................. 252/519.3; 252/500; 252/502; 252/506; 252/70; 252/71; 252/388; 252/387; 165/104.15; 165/104.19; 165/10; 136/263; 136/201; 257/21; 257/10; 257/202; 257/233; 428/403; 428/404; 977/712; 977/773; 977/774; 977/932

(58) Field of Classification Search ................ 252/500, 252/572, 390, 388, 394, 67, 71, 73, 74; 165/104.15, 165/104.16, 104.19; 524/81, 174; 427/212, 427/220, 217, 218, 219; 204/290.04; 136/201, 136/263; 257/21, 10, 202; 438/31.7; 977/712, 977/773, 774, 932; 528/425
See application file for complete search history.

(56) References Cited

U.S. PATENT DOCUMENTS

| | | | | |
|---|---|---|---|---|
| 4,755,536 A | * | 7/1988 | Mauldin et al. | 518/709 |
| 4,876,032 A | * | 10/1989 | Liepins et al. | 252/500 |
| 5,332,646 A | * | 7/1994 | Wright et al. | 430/137.22 |
| 5,453,297 A | * | 9/1995 | Dye et al. | 427/217 |
| 5,558,811 A | * | 9/1996 | Pialet | 252/73 |
| 5,716,551 A | * | 2/1998 | Unruh et al. | 252/500 |
| 5,810,980 A | * | 9/1998 | Edelson | 313/310 |
| 5,981,043 A | * | 11/1999 | Murakami et al. | 428/209 |

OTHER PUBLICATIONS

Report on "Electrides and Alkalides", from, Dept. of chemistry, Michigan State University, 2006, pp. 1-4.*
Cui et al, "Thiophene-Linked Polyphynelquinoxaline: A new electron transport conjugatedf polymer for electroluminescent devices," Report# A400763, Rochester University, Dept. of Chemical Engineering. Aug. 16, 1999, pp. 1-2.*

* cited by examiner

Primary Examiner—Mark Kopec
Assistant Examiner—Kallambella Vijayakumar

(57) ABSTRACT

A colloidal solution and/or nanocomposite having enhanced energy transfer between thermal, electron, phonons, and photons energy states. The composition comprises a synergistic blend of electrides and alkalides within a medium that effectively alters the mean free path. The composition is optionally further enhanced through externally generated fields and made into energy conversion devices.

9 Claims, No Drawings

COLLOIDAL SOLUTIONS AND NANOCOMPOSITES OF ELECTRIDES AND ALKALIDES AND METHODS OF USE

CROSS-REFERENCE TO RELATED APPLICATIONS

This application is a continuation-in-part of U.S. patent application Ser. No. 10/642,560 filed on Aug. 18, 2003, having the title "QUANTUM LILYPADS AND AMPLIFIERS AND METHODS OF USE" and included as reference only without priority claims.

BACKGROUND OF THE INVENTION

The present invention relates to compositions and method for enhancing the quantum energy conversion and altering the effective mean free path within a carrier medium.

Numerous devices depend on the conversion of energy from one form, such as thermal energy, to another form, such as electrical energy. The category of devices include, though not limited to, photoelectric, thermionic, thermoelectric, piezoelectric and electroluminescence. Common names for such devices include, though not limited to, fuel cells, photovoltaic cells, batteries, fluorescent lamps, and antennas.

Electrical conductivity compositions are utilized in a wide range of applications including, though not limited to: conductive inks, circuit boards, paints, electromagnetic and radio frequency interference protective coatings, and antennas. Electrical conductivity compositions include a wide range of solids and liquids. For example, conductive polymers doped with metallic fillings. Electrically conductive media provide electron pathways between an electrical source and sink, respectively cathode and anode, to transfer electrical energy.

A variety of materials can be used where (electron, photon, or phonon) flow is to be maximized and resistance is minimized. Such media can benefit from cost effective methods to maintain quantum energy levels by maximizing tunneling through the utilization of nanoscale layers.

The present invention provides a new and improved energy conversion composition comprised of electrides and alkalides with nanoscale additives having surface modified coatings, and within a carrier medium that enhanced the transfer and conversion of quantum energy and their method of use.

SUMMARY OF THE INVENTION

The term "nanoscale", as used herein, are particles having a mean average diameter of less than 1 micron meter and more particularly having a mean average diameter of less than 100 nanometers.

The term "mean free path length, is the distance of travel between collisions.

The term "functionalized", as used herein, refers to means as known in the art including whereby compounds are emulsified to control of hydrophobic, hydrophilic or molecular polarity, or chemically bonded (including hydrogen bonding), and adsorbed.

The term "microetching" process combines the advantage of a controlled and locally enhanced (i.e. grain boundary) etch attack with those benefits of peroxide etching solutions (i.e. high metal load, constant etch rate, absence of byproducts). At very low etch rates the new process simultaneously creates an optimal "macro- and micro-structure" on the metal surface with dendritic features, therefore providing the increased surface area and reduced interfacial tension.

The term "quantum dots", as herein referred, have zero-dimensional confinement and represent the ultimate in reduced dimensionality, i.e. zero dimensionality. The energy of an electron confined in a small volume by a potential barrier as in a quantum dot, hereinafter referred to as "QD" is strongly quantized, i.e., the energy spectrum is discrete. For QDs, the conduction band offset and/or strain between the QD and the surrounding material act as the confining potential. The quantization of energy, or alternatively, the reduction of the dimensionality is directly reflected in the dependence of the density of states on energy.

As used herein, the term "flow path" is used to imply the flow of electrons, phonons, or photons (i.e., electron transfer from a cathode to anode).

The inventive nanocomposite has quantum energy conversion and increased effective mean free path within a carrier medium. Said powders have an average particle size of from about 1 nanometer to about 1 micron and a nanoscale surface modification.

In accordance with one aspect of the invention, an enhanced nanocomposite comprises additives selected from the group of electrides and alkalides having an average particle size of from about 1 nanometer to about 1 micron; and a conductive medium selected from the group of carbon products, monomers, polymers, organometallics, and combinations thereof.

Yet another aspect of the present invention is the enhanced nanocomposite is subjected to a phonon or electron bias as induced by externally generated fields, whereby the externally generated fields include fields generated from the group of ultrasonic, acoustic phonon, magnetic, electromagnetic, and electrical fields.

In accordance with yet another aspect of the present invention, an enhanced colloidal solution comprises of additives selected from the group of electrides and alkalides having an average particle size of from about 1 nanometer to about 1 micron; and a quantum energy transfer solution that further increases the mean free path of electrons, phonons, and photons.

Yet another aspect of the present invention is the quantum energy transfer solution further comprised of additives selected from the group of electrides and alkalides having a surface modified nanoscale layer including surface modifications to functionalize for at least one purpose selected from the group promoting dispersion, enhancing corrosion resistance, enhancing chemical stability, enhancing molecular polarity, modifying hydrophobic or hydrophilic characteristics, enhancing solubility, providing stability against thermal and ultraviolet degradation, incorporating nucleating agents, enhancing means to make emulsions, and enhancing thermal or electrical conductivity.

Another aspect of the present invention is the enhanced colloidal solution is subjected to a phonon or electron bias as induced by externally generated fields, whereby the externally generated fields include fields generated from the group of ultrasonic, acoustic phonon, magnetic, electromagnetic, and electrical fields.

Yet another aspect of the present invention is the inclusion of the inventive enhanced nanocomposite and/or colloidal solution into a wide range of product applications. The applications include products selected from the group of energy conversion products including the group of thermionics, thermoelectric, photovoltaic, fuel cell, piezoelectrics, photoelectrics, ballistic tunneling, thermal diodes; and photon, electron, and photon emitters. The performance of such products is enhanced by further subjecting the product to a phonon or electron bias as induced by externally generated fields, whereby the externally generated fields include fields generated from the group of ultrasonic, acoustic phonon, magnetic, electromagnetic, and electrical fields.

Without being bound by theory, it is believed that the enhanced nanocomposites and colloidal solutions of this invention have increased mean free path by incorporating electrides and alkalides into a conductive medium.

Without being bound by theory, it is believed that in the path direction enhanced nanocomposites and colloidal solutions of this invention is influenced and controlled by externally generated fields.

Additional features and advantages of the present invention are described in and will be apparent from the detailed description of the presently preferred embodiments. It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

DETAILED DESCRIPTION OF THE PREFERRED EMBODIMENTS

The inventive enhanced nanocomposites and colloidal solutions are now set forth as a composite comprising of additives selected from the group of electrides and alkalides having an average particle size of from about 1 nanometer to about 1 micron; and a conductive medium selected from the group of carbon products, monomers, polymers, organometallics, and combinations thereof.

An enhanced nanocomposite comprising of additives selected from the group of electrides and alkalides having an average particle size of from about 1 nanometer to about 1 micron; and a conductive medium selected from the group of carbon products, monomers, polymers, organometallics, and combinations thereof. Without being bound by theory the mean free path of electrons and phonons is effectively increased by providing additional pathways for electron flow and increased interfacial area for phonon tunneling.

The conductive medium is preferably comprised of a conductive medium selected from the group of carbon products, monomers, polymers, organometallics, and combinations thereof having an average particle size of from about 1 nanometer to about 1 micron. The utilization of nanoscale materials that have superior thermal and electrical conductivity enhances the tunneling effectiveness and reduces the resistance to electron flow. The particularly preferred conductive medium is comprised of a conductive medium as selected from the group of carbon products, monomers, polymers, organometallics, and combinations thereof wherein the medium is functionalized with a nanoscale layer having an average thickness of from about 1 nanometer to about 100 nanometers. Functionalization of nanoscale materials increases the interfacial region and the energy transfer associated with electron and phonon flow. The specifically preferred electrides and alkalides are surface modified, complexed or functionalized with nanoscale layer selected from the group consisting of metals, metal oxides, organometallics, semiconductors, alloys, carbon products, and combinations thereof, the powder having a nanoscale layer having an average thickness of from about 1 nanometer to about 100 nanometers.

A further embodiment of the invention is the enhanced nanocomposite when subjected to a phonon or electron bias as induced by externally generated fields, whereby the externally generated fields include fields generated from the group of ultrasonic, acoustic phonon, magnetic, electromagnetic, and electrical fields. Without being bound by theory, the externally generated field creates a preferential pathway and sufficient bias to limit the return of cold electrons and phonons within the conductive medium. The result is effectively higher conductivity within the nanocomposite and colloidal solution.

Another method to improve the flow of electrons and phonons is the particularly preferred method of modifying the group of additives including conductive medium, electride, and alkalide additives with alternating nanoscale layers of conductive and semiconductor layers.

Another embodiment of the invention is an enhanced colloidal solution comprising of additives selected from the group of electrides and alkalides having an average particle size of from about 1 nanometer to about 1 micron; and a quantum energy transfer solution that further increases the mean free path of electrons, phonons, and photons. A more preferred colloidal solution contains additives selected from the group of carbon products, monomers, polymers, organometallics, and combinations thereof. A particularly preferred solution has additives that are functionalized for at least one purpose selected from the group promoting dispersion, enhancing corrosion resistance, enhancing chemical stability, enhancing molecular polarity, modifying hydrophobic or hydrophilic characteristics, enhancing solubility, providing stability against thermal and ultraviolet degradation, incorporating nucleating agents, enhancing means to make emulsions, and enhancing thermal or electrical conductivity. The colloidal solution extends the range of applications and products by maintaining the nanocomposite in the liquid state. One such application includes the use of the enhanced colloidal solution as a refrigerant or refrigerant additive, and heat transfer fluid or fluid additive. Additional applications include applications where electrically conductive is of high importance such as conductive inks or pastes. The resulting conductive inks or pastes are optionally further utilized for the production of devices that emit electrons phonons, or photons. Yet another utilization of conductive inks or pastes is the production of devices that encourage the flow of electrons phonons, or photons within the medium.

Yet another embodiment of the invention is the quantum energy transfer solution further comprised of additives selected from the group of electrides and alkalides having a surface modified nanoscale layer including surface modifications to functionalize for at least one purpose selected from the group promoting dispersion, enhancing corrosion resistance, enhancing chemical stability, enhancing molecular polarity, modifying hydrophobic or hydrophilic characteristics, enhancing solubility, providing stability against thermal and ultraviolet degradation, incorporating nucleating agents, enhancing means to make emulsions, and enhancing thermal or electrical conductivity. A more preferred colloidal solution is further comprised of surfactant wherein the interfacial tension of the additives is reduced. A particularly preferred colloidal solution is further comprised of quantum dots wherein the flow of electrons and phonons is further enhanced by effectively reducing the mean path length between said additives. A specifically preferred colloidal solution is subjected to a phonon or electron bias as induced by externally generated fields, whereby the externally generated fields include fields generated from the group of ultrasonic, acoustic phonon, magnetic, electromagnetic, and electrical fields.

A colloidal solution further comprised of self-assembly additives having features including self-assembly of nanolayers, monolayers, and nanoclusters is the most efficient method of creating structured products. The more preferred method of creating structured products is by functionalizing the additives for enhanced self-assembly through functionalization methods known in the art to increase polarity, to increase hydrophobic or hydrophilic characteristics, and the addition of block copolymers. The utilization of block copolymers, and functionalization and/or complexation of additives or substrate materials enable the creation of nanoscale structures. Subsequent processes that yield free radical generation, crosslinking, or polymerization achieve "curing" or in-situ polymerization (e.g., electron beam curing) in combination with the self-assembly process by the inventive colloidal solution results in permanent nanoscale structures. Multiple sequential steps whereby the physical properties of the colloidal solution vary from layer to layer (e.g., conductive additives followed by semiconductive additives) maximize conductivity.

The above nanocomposite, hereinafter referred to as conductive nanocomposite is assembled into a nanocomposite matrix. The matrix optionally consists of multiple layers of conductive nanocomposite. The matrix is further optionally comprised of alternating layers of nanocomposite doped with conductive additives, and nanocomposite doped with semiconductor additives. The alternating layers preferably have layer thickness less than 100 nanometers. More specifically preferred is layer thickness less than 10 nanometers.

The functionalized powders having a surface modified nanoscale layer within the conductive nanocomposite are optionally further functionalized for at least one purpose selected from the group promoting dispersion, enhancing corrosion resistance, reducing friction, enhancing chemical stability, enhancing molecular polarity, modifying hydrophobic or hydrophilic characteristics, enhancing solubility, providing stability against thermal and ultraviolet degradation, enhancing lubricity, improving mold release, varying color, incorporating nucleating agents, enhancing plasticity, or enhancing means to make emulsions.

A further embodiment of the invention is the colloidal solution subjected to a phonon or electron bias as induced by externally generated fields, whereby the externally generated fields include fields generated from the group of ultrasonic, acoustic phonon, magnetic, electromagnetic, and electrical fields. A particularly preferred colloidal solution is further doped with semiconductor additives. A specifically preferred colloidal solution is the further inclusion of solvated electrons within the colloidal solution to have features including the increased availability of free electrons.

Many products encompassing a wide range of applications are made from the inventive enhanced nanocomposite and/or colloidal solution. The applications include products selected from the group of energy conversion products including the group of thermionics, thermoelectric, photovoltaic, fuel cell, piezoelectrics, photoelectrics, ballistic tunneling, thermal diodes; and photon, electron, and photon emitters. The performance of such products is enhanced by further subjecting the product to a phonon or electron bias as induced by externally generated fields, whereby the externally generated fields include fields generated from the group of ultrasonic, acoustic phonon, magnetic, electromagnetic, and electrical fields.

Without being bound by theory, it is believed that nanoscale additives of this invention are powders having surface modified layer, wherein the layer is in the nanoscale regime, have quantum particles such as phonons that are effectively reflected rather than colliding with minimal momentum transfer. This effectively increases the mean free path length that is an important parameter for energy transfer. The powders are preferably made of materials selected from the group consisting of metals, metal oxides, organometallics, semiconductors, alloys, carbon products, and combinations thereof. The powders preferably have an average particle size from about 1 nanometer to about 1 micron. The powders preferably are surface treated with a nanoscale layer having an average thickness of from about 1 nanometer to about 100 nanometers. The nanoscale layer is more preferred when the layer is approximately a monolayer or multilayer. The nanoscale is specifically preferred when the layer is a monolayer not exceeding 100 nanometers in thickness. The nanoscale is particularly preferred when the layer is a monolayer not exceeding 20 nanometers in thickness. More particularly specific is a monolayer not exceeding 5 nanometers in thickness.

The conductive medium are also optionally functionalized for at least one purpose selected from the group promoting dispersion, enhancing corrosion resistance, reducing friction, enhancing chemical stability, enhancing molecular polarity, modifying hydrophobic or hydrophilic characteristics, enhancing solubility, providing stability against thermal and ultraviolet degradation, enhancing lubricity, improving mold release, varying color, incorporating nucleating agents, enhancing plasticity, or enhancing means to make emulsions.

The nanocomposite is also optionally further comprised of surfactant wherein the interfacial tension of the powders is reduced. The nanocomposite is also optionally further comprised of quantum. The surface modified powders are optionally further subjected to microetching process wherein the surface topography is modified with nanoscale dendritic features.

The conductive nanocomposite, comprised of carbon products, monomers, polymers, organometallics, metals, metal oxides, and semiconductors, are optionally chemically modified by non-thermal methods. The non-thermal methods, without being bound by theory, have the advantage of inducing a series of chemical reactions including reductions, polymerizations, and oxidation reactions at faster rates, higher densities, and superior control. The non-thermal methods are preferably selected from the group of microwave and electron beam. More preferred is the utilization of additional methods known in the art to control beam direction, and selective beam penetration into the conductive nanocomposite. The non-thermal method of achieving chemical modification is preferably subjected to a phonon or electron bias as induced by externally generated fields as referenced above.

A wide range of products are made from the above resulting nanocomposite matrixes. These products are optionally and more preferably further subjected to a phonon or electron bias as induced by externally generated fields. The externally generated fields are preferably selected from the group of ultrasonic, acoustic phonon, magnetic, electromagnetic, and electrical fields. The externally generated fields have the ability to produce byproducts selected from the group of conductive polymers, nanotubes, nanohorns, and fullerenes. The synthesis of nanotubes, nanohorns, and fullerenes are typically produced from carbon products. Nanotubes can be produced from a series of metals, organometallics, semiconductor materials, and combinations thereof. The derived products are optionally and preferably utilized as energy conversion products selected from the group of thermionics, thermoelectric, photovoltaic, fuel cell, piezoelectrics, photoelectrics, ballistic tunneling, thermal diodes; and photon, electron, and photon emitters.

Without intending to limit the scope of the invention, the following examples describe methods of forming and using conductive nanocomposite of the present invention.

EXAMPLES

Example 1 a) Cooper is solubilized in anhydrous ammonia.
b) The resulting electride is complexed with tolytriazole.
c) Complexed cooper of above is dispersed into a solution of polyaniline.

Example 2 a) The resulting nanofluid of Example 1 is utilized as a refrigerant.

Example 3 a) Example 1 of above is dispersed into a precursor polyparaphenylene-vinylene.
b) The resulting blend of above, known as conductive monomer is placed onto a glass plate and using a doctor knife made into a film of 1 micron.
c) The above nanocomposite is polymerized by non-thermal curing using an electron beam emitter and a screen to create polymerized microchannels having a depth of 1 micron.
d) Melted sacrificial material made from wax is placed on the above nanocomposite matrix film microchannel to completely fill 99% of the microchannel voids. Excess material is removed.
e) The steps c through e are repeated four times to achieve a multilayer thermionic device.

Example 4 a) Titania is complexed with acetylacetone.
b) Example 1 is combined with the complexed titania.
c) Complexed copper and titania mixture of above is dispersed into a solution of polyaniline.
d) The resulting nanofluid is utilized as a refrigerant.

Example 5 a) Titania is complexed with acetylacetone.
b) Example 1 is combined with the complexed titania.
c) Complexed copper and titania mixture of above is dispersed into a solution of polyaniline and polyamic acid.
d) The above nanocomposite is polymerized by non-thermal curing using an electron beam emitter and a screen to create polymerized microchannels having a depth of 1 micron.

e) The conductive layers will introduce a voltage bias to accelerate and bias the flow of phonons and electrons from the hot side to the cold side, and minimize the return of cold electrons into the hot side.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

What is claimed is:

1. An enhanced nanocomposite comprised of alternating layers of nanocomposite doped with conductive additives, and nanocomposite doped with semiconductor additives, whereby the additives include additives selected from the group consisting of electrides and alkalides having an average particle size of from about 1 nanometer to about 1 micron.

2. The enhanced nanocomposite according to claim 1, whereby the nanocomposite is further comprised of surface modified additives having a nanoscale layer.

3. The enhanced nanocomposite according to claim 2, whereby the layer is functionalized for at least one purpose selected from the group consisting of providing stability against thermal and ultraviolet degradation, and enhancing thermal or electrical conductivity.

4. The enhanced nanocomposite according to claim 1, whereby the nanocomposite is further comprised of quantum dots.

5. The enhanced nanocomposite according to claim 1, whereby the nanocomposite is subjected to a phonon or electron bias as induced by externally generated fields including fields generated from the group consisting of ultrasonic, acoustic phonon, magnetic, electromagnetic, and electrical fields.

6. The enhanced nanocomposite according to claim 1, whereby the nanocomposite is further comprised of solvated electron solution having features including increased availability of free electrons.

7. Products are made from enhanced nanocomposite according to claim 1.

8. The enhanced nanocomposite according to claim 7, whereby the products are further subjected to an electron bias as induced by externally generated fields, whereby the externally generated fields include fields generated from the group consisting of magnetic, electromagnetic, and electrical fields.

9. The enhanced nanocomposite according to claim 7, wherein said product is a photon to electron or phonon to electron energy conversion product selected from the group consisting of thermionics, thermoelectric, photovoltaic, photoelectrics, thermal diodes; and electron emitter.

* * * * *